March 19, 1929.  H. T. BOOTH  1,705,896
LANDING GEAR FOR AEROPLANES
Filed Dec. 5, 1925
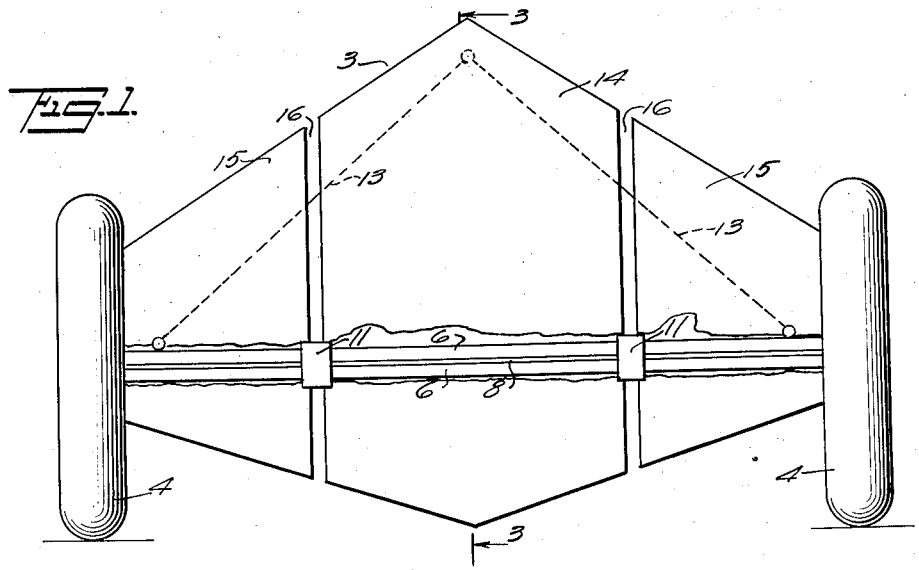
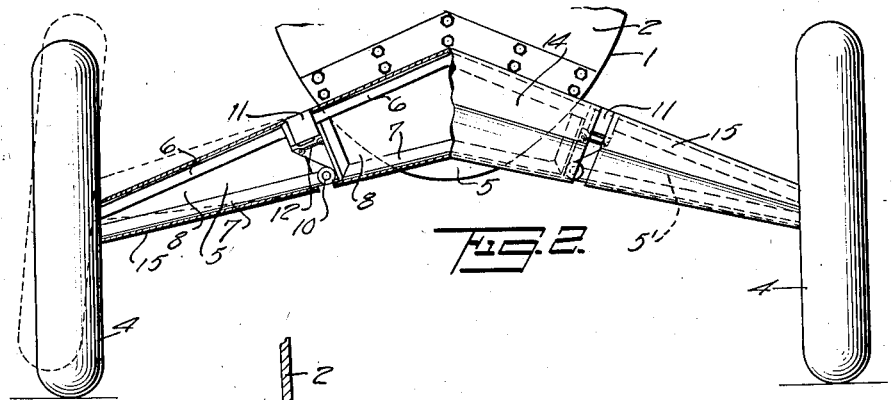
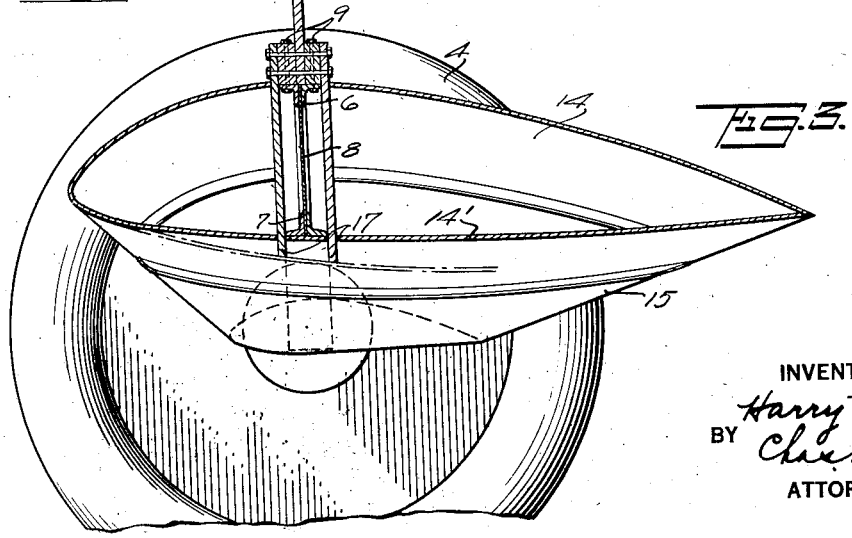
INVENTOR
Harry T. Booth
BY Chas. H. Keel
ATTORNEY Patented Mar. 19, 1929.

1,705,896

UNITED STATES PATENT OFFICE.

HARRY T. BOOTH, OF FREEPORT, NEW YORK, ASSIGNOR TO LEONARD W. BONNEY, OF FLUSHING, NEW YORK, AND KIRKHAM PRODUCTS COMPANY, OF GARDEN CITY, NEW YORK, A CORPORATION.

LANDING GEAR FOR AEROPLANES.

Application filed December 5, 1925. Serial No. 73,302.

This invention relates to aeroplanes and particularly to a chassis and landing gear therefor.

The object of the invention generally is a novel chassis and landing gear for aeroplanes whereby the shocks at landing and while running along the surface are minimized, and especially a landing gear and shock absorbing mechanism characterized by its simplicity and ruggedness in construction, the readiness by which it may be repaired and the economy by which it may be manufactured and mounted on the craft. A further object of the invention is a combined fuselage and landing chassis of novel construction and assembly and capable of being economically manufactured and assembled into a durable structure capable of withstanding to a marked degree the rough usage to which such devices are subjected.

For a better understanding of the invention, reference may be had to the accompanying drawings forming a part of this application wherein, Fig. 1 is a plan view of the chassis separated from the craft, Fig. 2 is a front skeleton view of the landing gear, and Fig. 3 is a part sectional and part longitudinal sectional view through the landing gear.

Referring to the drawings where like numerals designate similar parts throughout, I have illustrated my invention as embodied in an aeroplane having a fuselage or main body 1 with a transverse bulkhead 2 therein. The landing gear, designated generally by the numeral 3 in Fig. 1 is a self-contained unit including an axle frame arranged transversely of the fuselage 1 and carrying a pair of wheels 4 on the opposite ends thereof. The axle structure is formed of a built up I-beam, the latter being formed of a pair of upper L members 6 and a pair of lower mating L members 7 joined by an intermediate web 8. This I-beam is of an inverted V form with the apex thereof disposed in the fuselage 1 and carried by the supporting bulkhead 2. In the particular embodiment shown the means of supporting the structure from the bulkhead 2 consists of a pair of blocks 9 disposed on opposite sides of the bulkhead 2 which are secured to both the L channels 6 and the bulkhead 2 by the transversely arranged bolts indicated. The axle structure is divided into three parts,—a central part 5 and the two end parts 5', the latter carrying the wheels 4 on their free ends. The end parts 5' of the axle structure are formed of a built up I-beam similarly to the central structure 5. The junction between the central structure 5 and either of its end sections 6 is in the form of a pivoted connection 10 permitting the up and down pivotal movements of the end sections 6 about the horizontal axes 10, suitable spaces being provided between the adjacent upper edges of the structures 5 and 5' to permit the relative up and down movement, and in these spaces are disposed a readily compressible and resilient material 11, which upon the upward pivotal movements of the wheels with their stub axles 5' are compressed to form a shock absorbing or yielding mechanism for the chassis. This yielding material may be in the form of a rubber block or blocks retained in position in any suitable manner so as to form a permanent part of the landing gear. At 12 I have indicated a flexible tying means for the purpose of limiting the relative downward movement of the wheels 4 and their stub axles 6 which may be of cord or wire or any other material answering this purpose. This tying means 12 is attached to the adjacent parts 5 and 5' of the divided axle structure at points above the pivotal connection indicated and thereby limits the downward pivoting movement of the wheel 4. At 13 I have indicated, more or less diagrammatically, a pair of pivoted struts 13 which are pivotally fastened to the stub axles 5' at any suitable point near their outer ends and are pivotally fastened at their other ends to any fixed part or parts of the framework of the craft, as for example a bulk-head of the fuselage. These struts relieve the axle structures 5, 5' of the horizontal strains put thereupon at landing, and their pivotal connections with the axle and craft frame structure permit the free floating and upwardly pivoting movements of the wheels 4 and their stub axles 5' while running on the ground. In the particular embodiment shown these struts 13 extend rearwardly from the elongated axles 5'.

The axle structure is provided with a stream line fairing divided into a central part 14 and end parts 15, these fairings being carried respectively by the structures 5 and 6. The central fairing 14 is of inverted V shape in cross-section transverse of the fuselage corresponding to the V shape of the central axle structure 5. Suitable fore and aft spaces 16 are provided between the adjacent fairings to permit the relative pivoting movement of the fairings 14 and 15. A complete chassis unit includes the axle structures 5 and 5' and the fairings 14 and 15, and the whole is carried by the bulkhead 2 in the above described manner. After the anchoring of the central portion 5, 14 of the chassis to the bulkhead 2 the fairing or cowling for the fuselage 1 is then built up about the fairing 14 of the landing gear, suitable downwardly extending fastening devices 17 being provided down below the lower part 14' of the fairing 14 to which fastening 17 the fuselage cover or fairing is secured at its under side.

The axle structure which is split at the two points closely adjacent the fuselage 1 together with the pivotal connections of the same for vertical movements of the end parts of the axle and the intermediate compressible blocks 11 forms a particularly satisfactory landing gear in that the structure is not only of the simplest character and capable of being economically manufactured, but may be overhauled and repaired with marked facility. For example, the yielding material 11 may be readily removed and renewed at any time, and moreover the structure is a particularly rigid and durable one. The self-contained feature of the chassis is also important in that the fairing of the chassis is a unit in itself, separate and distinct from the fairing of the fuselage, it being a simple matter to build up the fairing for the fuselage about the central fairing 14 of the landing gear.

Having thus described my invention, what I claim and desire to protect by Letters Patent is:

1. In an aeroplane a main framework and a landing gear carried thereby consisting of an inverted V shaped axle fastened at its apex to the craft framework and divided transversely into three parts with a rigid central part having the two end parts pivotally carried thereby for vertical movements about horizontal axes, the pivoted parts being spaced from the central part at their upper edges, and having disposed therebetween compressible and resilient devices to yieldingly resist the upward movements of the axle ends, means for limiting the relative downward movement of the pivoted axles and a pair of drift members extending forwardly from the pivoted ends of the axle structure to fixed parts of the craft framework.

2. In an aeroplane a main framework and a chassis or landing gear therefor including a transverse axle structure which is divided into a central part and two end parts, said parts being pivoted at their lower adjacent edges for relative vertical movements about horizontal axes, said divided parts having suitable spaces or recesses between their upper edges and disposed above the pivotal axes and a compressible and resilient material disposed in each of said recesses, said resilient material being gripped by the opposing edges of the adjacent relatively pivoted axle structure members and yieldingly resisting the relative vertical pivotal movements of the divided structures together with means for limiting the downward pivotal movement of the end structures.

3. An aeroplane of the character set forth in claim 2 including drift connections extending fore and aft from the end pivoted structures of the axle to fixed parts of the body structure.

4. A landing gear of the character set forth in claim 2 wherein the compressible and yielding material is in the form of rubber blocks.

5. In an aeroplane, the combination of a fuselage structure and a chassis or landing gear therefor including a transverse axle structure passing through the fuselage and divided at points adjacent the fuselage into a central part and two end parts of substantial length, said central part being fixed to the fuselage structure and said end parts being pivoted to the central part at their lower adjacent edges for relative vertical movements about horizontal axes, said divided parts having suitable spaces or recesses between their upper edges and disposed above the pivotal axes and a compressible and resilient material disposed in each of said recesses, said resilient material being gripped by the opposing edges of the adjacent relatively pivoted axle structure members and yieldingly resisting the relative vertical pivotal movements of the divided structure together with means for limiting the downward pivotal movement of the end structures.

6. A landing gear for aircraft comprising a wheeled axle which is divided and has its parts pivotally connected directly to each other on a fore and aft axis for relative adjustments in a vertical plane and a compressible and resilient device disposed on one side of the pivotal connection and disposed between and directly engaged by the divided parts for yieldingly opposing the upward vertical pivotal movements.

7. A landing gear of the character set forth in claim 2 having individual stream line fairings for the three part axle structure, said fairings being spaced from each other along fore and aft lines to permit the relative yielding and pivotal movements of the wheels and the craft.

8. An aeroplane including a unitary landing gear having a continuous transverse axle structure with a substantially continuous stream line fairing from end to end of the axle, means for supporting said landing gear unit from a fixed part of the aeroplane structure and fuselage cowling built up around the continuous landing gear fairing.

9. A landing gear for aircraft comprising a transverse wheeled axle divided with its parts pivotally connected directly to each other for relative adjustments in a vertical plane, and a compressible and resilient device disposed above the level of the pivotal connection and disposed between and directly engaged by the divided parts of the axle for yieldingly opposing the upward vertical pivotal movements.

10. A landing gear for aircraft of the character set forth in claim 9 including means for limiting the downward relative pivotal movements of the divided axle parts.

11. A landing gear for aircraft comprising a wheeled transverse axle pivoted on a fore and aft axis at a point below its longitudinal center line to a structure carried by the main frame of the aeroplane and a compressible and resilient device disposed above said pivotal axis and engaged directly by the end of the axle at a point or points above said axis, the other side of said compressible and resilient device being engaged directly by the structural part in line with the upper portion of said axle.

In testimony whereof, I have signed my name to this specification.

HARRY T. BOOTH.